March 23, 1937.   A. WILSTAM   2,074,602
MOTIVE POWER PRODUCING APPARATUS
Filed Jan. 25, 1935   2 Sheets-Sheet 1
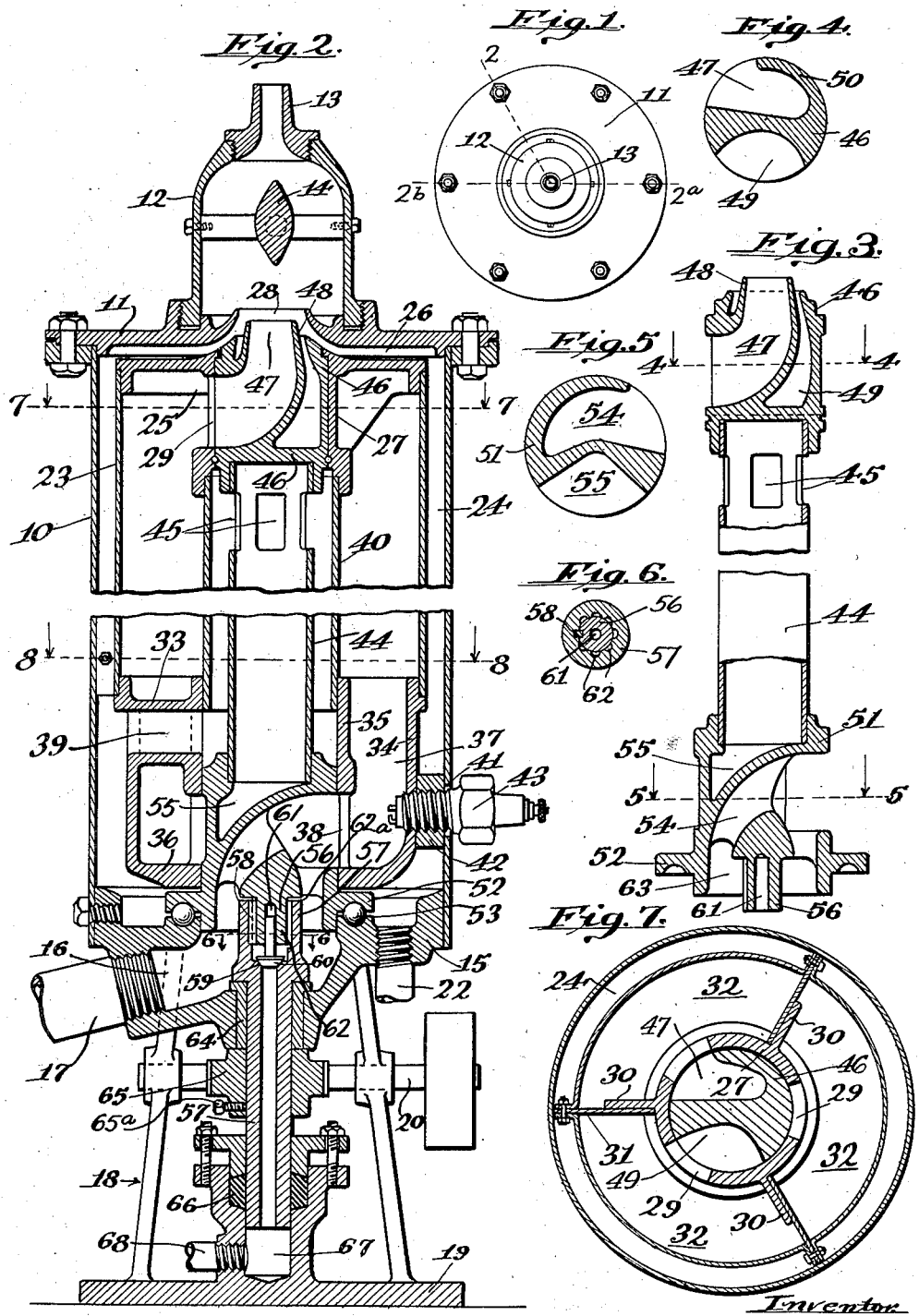

March 23, 1937. A. WILSTAM 2,074,602
MOTIVE POWER PRODUCING APPARATUS
Filed Jan. 25, 1935 2 Sheets-Sheet 2
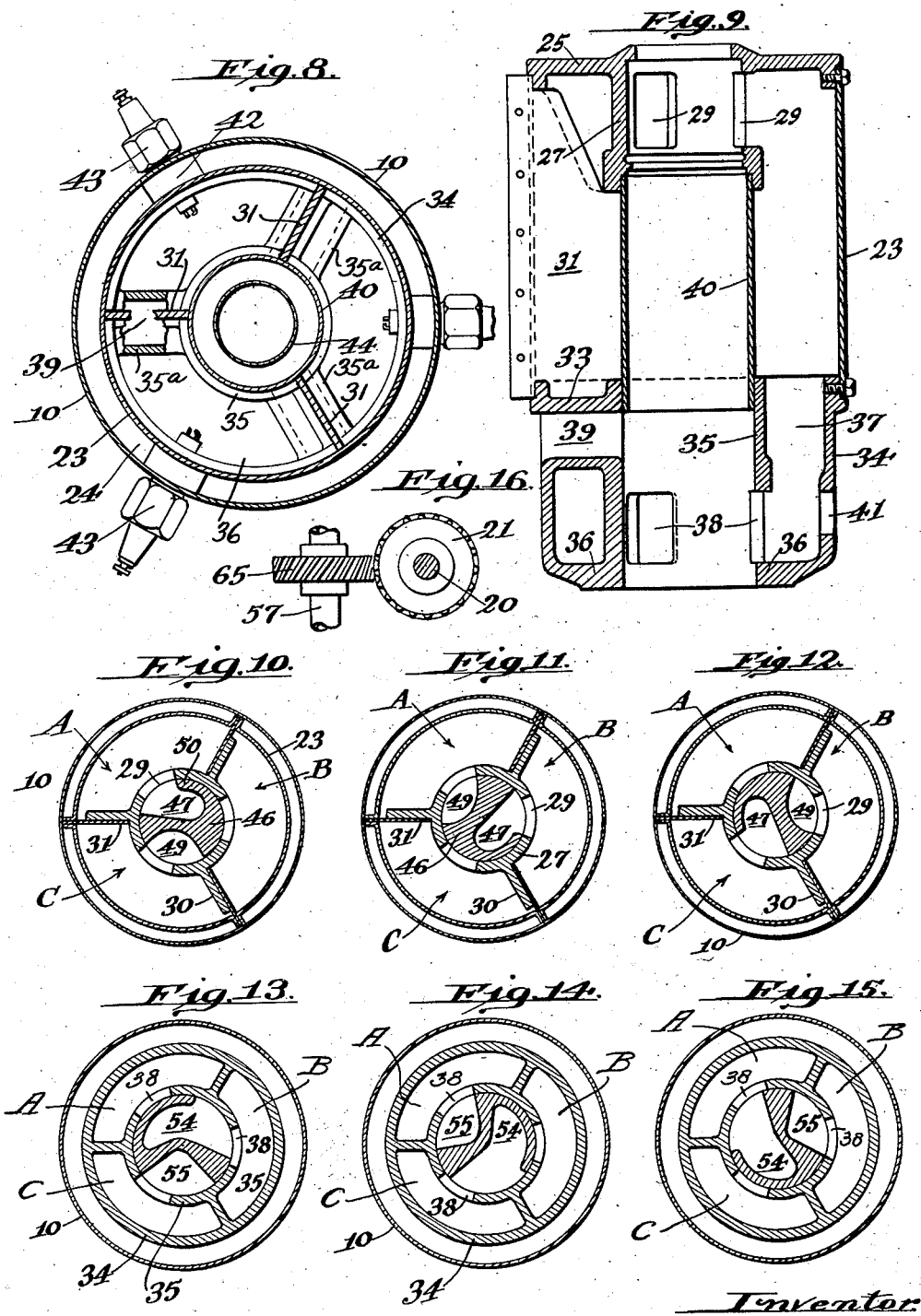
Inventor:
ALFRED WILSTAM.
By Martin P. Smith
Attorney.

Patented Mar. 23, 1937

2,074,602

UNITED STATES PATENT OFFICE 2,074,602

MOTIVE POWER PRODUCING APPARATUS

Alfred Wilstam, Altadena, Calif.

Application January 25, 1935, Serial No. 3,436

5 Claims. (Cl. 60—44)

My invention relates to a motive power producing apparatus and has for its principal object, the provision of a relatively simple and practical apparatus that may be economically employed for utilizing the heat energy of a fuel, preferably liquid or gaseous, with air, through successive combustive explosions in a series of closed chambers, thereby attaining in the combustion gases, pressure and temperature, which temperature is lowered by the addition of a sufficient quantity of air of suitable pressure, to a point where the gaseous mass may be safely and advantageously used as a medium for producing mechanical power through a gas turbine or for any other purpose.

My invention is characterized by a substantially cylindrical vessel within which are formed inner and outer air cooling spaces and between which are located chambers within which the fuel is ignited and exploded.

In the center of the apparatus is a common shaft provided with inlet and outlet valves and also a fuel inlet that is located adjacent the part of the shaft that carries the inlet valve.

Leading from the outlet valve and from the cooling air spaces are nozzle shaped openings that discharge into a gas holder or mixing tank and as the valve shaft is rotated, the supply and discharge valves control the explosion chambers that are disposed around said valve shaft.

In the accompanying drawings the apparatus is illustrated with three explosion chambers although the number of chambers may vary, and where three chambers are employed, there are three charging functions, three explosion discharge functions and three scavenging functions for each complete rotation of the valve shaft.

The function of the gas holder is to receive and mix the combustion gases with cooling air and to equalize the flow of discharge.

From the standpoint of enery input to the power producing system, not all of the work done in raising the pressure of the cooling air should be considered as a loss, for with a certain required power output, the total power for compressing the air should be added. The theoretical energy absorbed in the compression must be considered as energy injected into the system, the same as so much energy from fuel, and only the frictional and other losses incident to the compression should be added to the general loss of the system.

With the foregoing and other objects in view my invention consists in certain novel features of construction and arrangements of parts that will be hereinafter more fully described and claimed and illustrated in the accompanying drawings in which:

Fig. 1 is a top plan view of my improved motive power apparatus.

Fig. 2 is a vertical section taken through the center of the apparatus with the upper portion thereof taken on the line 2—2ᵃ, Fig. 1, and with the lower portion taken on the line 2ᵇ—2ᵃ, Fig. 1.

Fig. 3 is a vertical section taken through the center of the valve carrying shaft with the upper and lower parts thereof shown in the same positions as they appear in Fig. 2.

Fig. 4 is a horizontal section taken on the line 4—4 of Fig. 3.

Fig. 5 is a horizontal section taken on the line 5—5 of Fig. 3.

Fig. 6 is a detail horizontal section taken on the line 6—6 of Fig. 2.

Fig. 7 is a horizontal section taken on the line 7—7 of Fig. 2 with the distributing valve removed from the valve seat.

Fig. 8 is a horizontal section taken on the line 8—8 of Fig. 2.

Fig. 9 is a vertical section taken through the housing that is provided with the explosion chambers and through which the valve shaft passes.

Figs. 10, 11 and 12 are horizontal sections similar to Fig. 7 and showing the positions of the upper valve during the filling, explosion and scavenging functions that constitute one cycle of operation or one complete rotation of the valve carrying shaft.

Figs. 13, 14 and 15 are horizontal sections taken through the lower portion of the apparatus and the lower one of the valves and showing the positions thereof during the filling, explosion and scavenging functions that constitute one cycle of operation or one complete rotation of the valve shaft.

Fig. 16 is a plan view in detail of a portion of the means utilized for driving the rotary valve that extends axially through the apparatus.

Referring by numerals to the accompanying drawings which illustrate a preferred embodiment of my invention, 10 designates a substantially cylindrical shell that forms the outer housing of the apparatus, which shell is preferably arranged in an upright or vertical position as illustrated.

The upper end of this shell is closed by a head 11 to the center of which is secured the lower end of an upwardly projecting bell-shaped housing 12 and projecting from the upper end of said housing is a nozzle 13.

Suitably supported in the center of the bell 12, preferably by radially disposed arms, is a diverter 14 that is effective in producing a main thorough mixing and intermingling of the gases and air as the same pass through the bell and out through a discharge opening or nozzle 13.

The lower end of shell 10 is closed by a head 15 provided with a centrally arranged opening and below said opening is formed a chamber 16. Connected to this chamber is a pipe 17 that is utilized for supplying air to the apparatus of a pressure somewhat above atmospheric pressure.

The apparatus is supported by a suitable frame work 18 that extends from head 15 to a base plate 19 and journaled in this frame work is a shaft 20 that may be driven in any suitable manner and said shaft carrying a gear wheel 21.

Leading through head 15, is a pipe 22 that is utilized for supplying cooling air under pressure to the apparatus.

Fixedly mounted within the upper portion of the shell 10 and concentrically arranged therein, is a shell 23 and the diameter thereof is slightly less than the diameter of shell 10, so as to form an annular chamber 24 between the shells.

The upper end of shell 23 is closed by a head that includes a disc-like plate 25 that is positioned a short distance below head 11 so as to form a space 26 between said plate and head.

Formed integral with and depending from the center of plate 25, and forming a part of the head for cylinder 23, is a circular wall 27 that encloses and provides a valve seat for the upper one of the valves carried by the central valve shaft.

The opening through plate 25 at the upper end of this circular wall is positioned directly below an upwardly tapered opening 28 that is formed in the center of head 11, thus permitting the free flow of air and gases from the space 26 into the chamber within bell 12.

Formed through the wall of valve seat 27 below plate 25, are three openings 29 disposed 120° apart and projecting outwardly from wall 27 between these openings 29, are vertically disposed webs or flanges 30, to which are secured by welding or otherwise the upper inner portions of vertically disposed partitions 31 that divide the space within shell 23 into three equal sized chambers 32. These chambers function as combustion chambers for the gaseous fuel admitted to the apparatus.

The outer vertical edges of the partitions 31 are suitably secured to the wall of shell 23, preferably by welding or by riveting or bolting the outer edges of said partitions to the outwardly turned flanges on the outer vertical edges of the three sections of material utilized in forming said shell as illustrated in Fig. 7, and these outwardly turned flanges with the interposed portions of the partitions 31 constitute vertically disposed partitions that divide the annular space 24 into three chambers of equal size.

The lower end of shell 23 and the lower ends of partitions 31 are suitably secured to a ring plate 33 that forms the upper member of the head for the lower end of shell 23, which head is in the form of a chambered casting, as illustrated in Figs. 2, 8 and 9.

This head includes an outer cylindrical wall 34, the upper end of which is formed integral with plate 33, also a concentrically arranged inner cylinder wall 35, the upper end of which is formed integral with plate 33.

The opening through wall 35 accommodates the valve carried by the lower portion of the valve shaft as hereinafter described and the lower ends of the outer and inner walls 34 and 35 are connected by an integral ring plate 36.

The space 37, between the walls 34 and 35 is divided into three chambers by vertically disposed partitions 35a, that are disposed between said walls 34 and 35 and the upper portions of these three chambers communicate respectively with the lower ends of the three chambers 32 in shell 23 and formed through the lower portion of the wall 35 of valve seat are three openings or ports 38 that are disposed 120° apart.

Formed through the upper portions of the walls 34 and 35 are horizontally disposed ducts 39 that are spaced 120° apart and which are offset from the ports 38 approximately 60°.

An imperforate cylindrical wall 40 has its upper end seated in the lower portion of wall 27 and the lower end of this wall 40 extends downwardly into the upper portion of wall 35.

The inner edges of the vertical partitions 31 bear directly against and if desired may be connected to the wall 40.

Formed through the lower portion of shell 10 and through wall 34, are horizontally aligned openings 41 that are disposed 120° apart and in radial alignment with the openings 38 and seated in these openings and in filler blocks 42 that are positioned between shell 10 and wall 34, are spark plugs 43, the terminals of which project into the annular chamber 37.

The centrally arranged valve carrying shaft will now be described.

This shaft, which is illustrated in detail in Fig. 3, comprises a tubular body portion 44 that is provided near its upper end with a series of ports 45 that establish communication between the chamber within the tube 44 and the annular chamber between said tube and the cylindrical wall 40. This tube is concentrically arranged within and extends through tube 40 and mounted on the upper end of tube 44 and arranged for rotation within the wall 27, is a valve head 46.

Formed in head 46 is a port 47, the upper portion of which is vertically disposed and said upper portion being surrounded by a flange or wall 48 that projects into and partially through the tapered opening 28 that is formed in the center of head 11. The lower portion of port 47 curves outwardly to the outer face of head 46 so as to successively register with the ports 29 in valve seat 27 as the valve is rotated.

A second port 49 is formed in head 46, the lower outer end of which port 49 is adapted to successively register with the ports 29 and the upper end of this port 49 surrounds the flange 48 at the upper end of port 47 (see Fig. 3). Thus the upper ends of both ports 47 and 49 communicate directly with the opening 28 through head 11.

At one side of the lower end of port 47 is an arcuate flange 50, which is adapted to close one of the ports 29 during the time the opposite port 49 is in registration with another one of the ports 29 so as to properly control the flow of combined gases and air from the chambers 32 through the ports 47 and 49 into the chamber within bell 12.

Secured to the lower end of the tubular member 44, is a valve head 51 that has bearing within the lower portion of wall 35.

Formed integral with the lower portion of head 51 is an outwardly presented flange 52 that is positioned immediately above head 15 and interposed between said flange 52 and head 15 are antifriction members preferably balls 53.

Formed through head 51, is a port 54, the upper outer end thereof opening on the exterior of the head so as to successively register with the ports 38 in wall 35 and the lower end of this port is open at the lower end of the head so as to be in constant communication with chamber 16, to which air supply pipe 17 is connected.

Formed through head 51 on the opposite side from port 54 is a scavenging port 55, the upper end of which is open so as to be in constant communication with the lower end of tube 44 and the outer end of this port 55 opens on the periphery of head 51 so as to successively register with the ports 38.

Depending from the underside of head 51, is a short cylindrical lug 56 that is seated in the upper portion of a depending tubular shaft 57. The upper end of shaft 57 is connected to lug 56 by a key 58.

Formed in the upper portion of shaft 57, is a valve seat 59 that is normally closed by a gravity check valve 60 and the stem of the latter projects upwardly into an axial bore 61 that is formed in lug 56.

Formed in the upper portion of shaft 57 above the valve 60 and surrounding lug 56, is a series of vertically disposed ducts 62 that permit a gaseous fuel, after having passed valve 60, to discharge upwardly and thence outwardly between the upper end of shaft 57 and lug 56 into an annular chamber 63 with which the lower ends of ports 54 and 55 communicate.

The upper portion of shaft 57 has a bearing 64 in the lower portion of head 15 and mounted on said shaft just below said bearing is a gear wheel 65 that is engaged by gear wheel 21.

The lower portion of shaft 57 passes through a stuffing box 66 into a chamber 67 that is formed in base 19 and leading to this chamber 67 is a gaseous fuel supply pipe 68.

In the operation of my improved motive power producing apparatus, liquid or gaseous fuel is supplied through pipe 68 and passes through chamber 67 upwardly through tubular shaft 57 past check valve 60, thence upwardly through ducts 62 and this gas discharges radially outward through the space 62a between the upper end of tubular shaft 57 and valve head 51.

Air of a pressure somewhat above atmospheric pressure is delivered to chamber 16 through pipe 17 and the air under pressure for cooling and scavenging is delivered to the apparatus through pipe 22.

Valve shaft 44 carrying valve heads 46 and 51 at its ends is rotated by the engagement of gear wheel 21 with gear wheel 65, the latter being secured preferably by means of a set screw 65a on tubular shaft 57 that forms an extension of the valve carrying shaft.

The liquid or gaseous fuel mixed with air is admitted successively into the chambers 32 within the apparatus through the port 54 in valve 51 as the upper open end thereof successively registers with the openings 38 in wall 35 and referring to Figs. 10 and 13 it will be assumed that chamber A is filled with a fuel mixture. At this point the fuel charge is ignited by a spark produced between the terminals of the plug that projects into the lower portion of this particular chamber so that an explosion takes place and the resultant high pressure discharges through the corresponding opening 29 and through the port 47 in the upper valve which is in registration with said port 29.

During this explosion period in chamber A, a fuel charge is passing through port 54 in the lower valve into chamber B inasmuch as said port 54 is in registration with inlet port 38 at the lower end of chamber B as illustrated in Fig. 13.

Further rotation of the valve carrying shaft moves valve 46 so that port 47 registers with the opening 29 at the upper end of chamber B as illustrated in Fig. 11 and valve 51 is moved so that the opening 38 at the lower end of chamber B is closed and when such condition exists the fuel charge within chamber B is ignited by a spark produced between the terminals of the spark plug that projects into the lower portion of said chamber. During this explosion in chamber B, chamber A is scavenged by air that is delivered to the apparatus through pipe 22 and which air passes from the annular chamber surrounding wall 34 through the ducts 39, thence upwardly through the annular space between shaft 44 and the surrounding wall 40, thence through the openings 45, thence downwardly through shaft 44 and thence through port 55 in valve 51 and which last mentioned port is in registration with the opening 38 at the lower end of chamber A.

This combined cooling and scavenging air passes upwardly through chamber A, thereby scavenging the same and the products of combustion pass out through port 49 and that one of the openings 29 with which said port is in registration.

The products of combustion thus forced out of chamber A pass from the open upper end of port 49 and then pass through opening 28 into the chamber within bell 12 to mix with the gases passing therethrough and this mixture finally discharges through nozzle 13.

While the explosion is taking place in chamber B and chamber A is being scavenged, chamber C is being filled with a fuel charge inasmuch as port 54 in valve 51 is in registration with the opening 38 at the lower end of chamber C as illustrated in Fig. 14 and when the valves have moved to the position as illustrated in Figs. 12 and 15, the fuel charge admitted to chamber C will be ignited by a spark produced between the terminals of the corresponding spark plug while the products of combustion in chamber B will be scavenged and a fuel charge will be admitted to chamber A which was previously scavenged.

Thus where the apparatus is constructed with three chambers as illustrated there will be three filling or charging functions, three explosions and three scavenging functions for each complete rotation of the valve shaft and referring more particularly to Figs. 10 to 15 inclusive, chamber C will be receiving a fuel charge and the products of combustion in chamber B will be scavenged while the explosion takes place in chamber A.

On the second step of the cycle, chamber A will be scavenging and chamber C filling with a fuel charge while the explosion takes place in chamber B, as illustrated in Figs. 11 and 14 and on the third step of the cycle as illustrated in Figs. 12 and 15 chamber A will be filling and chamber B will be scavenging as the explosion takes place in chamber C.

The air admitted through pipe 22 circulates through annular chamber 24 that surrounds the chambers in which combustion takes place, thereby exerting a cooling effect and this air after absorbing a certain amount of the heat generated as a result of the explosions passes out through opening 28 in head 11 to mix with the mixture of air and gases that passes through bell 12 and discharges through nozzle 13.

A portion of this cooling air, as hereinbefore described passes through ducts 39 and thence through the tubular shaft 44 to materially assist in the cooling and scavenging functions.

It will be understood that the port 54 in valve 51 controls the admission of the fuel charge to the lower portions of the combustion chambers and that port 55 controls the admission of cooling and scavenging air to the lower ends of said chambers and further that port 47 in valve 46 controls the outlet of products of combustion resulting from the explosions from the chambers 32 to the chamber within bell 12 and that port 49 controls the outlet of burnt gases and the like that are scavenged from the chambers after combustion takes place therein.

My improved motive power producing apparatus may be constructed with any number of explosion chambers and any fuel such as gas, liquid hydrocarbon or pulverized coal may be delivered into the combustion chambers with a certain percent of air to form the combustible mixture.

It will be understood that minor changes in the size, form and construction of the various parts of my improved motive power producing apparatus may be made and substituted for those herein shown and described, particularly as to the number of explosion chambers used, without departing from the spirit of my invention, the scope of which is set forth in the appended claims.

I claim as my invention:

1. In a motive power producing apparatus, a stationary housing divided into a plurality of chambers, valve seats located within said housing adjacent its ends, said valve seats being provided with ports that communicate respectively with the chambers in said housing, a member arranged for rotation within said housing between said chambers, valves carried by said rotating member and occupying said valve seats, each valve being provided with ports that register with the ports in the valve seats as the valve carrying member is rotated, means for delivering fuel charges to one of said valve seats, means for igniting the fuel charges in the chambers in said housing, a chamber for receiving the products of combustion and air from said chambers, said last mentioned chamber having an outlet, means for imparting rotary motion to said rotatably mounted valve carrying member, a shell enclosing and spaced apart from said housing, means for delivering air to the chamber between said shell and housing and means whereby a portion of the air delivered into the chamber between the shell and housing is caused to circulate around and through a part of the valve carrying member and to pass successively into the chambers within said housing for cooling and scavenging purposes.

2. In a motive power producing apparatus, a stationary housing divided into a plurality of chambers, valve seats arranged between said chambers adjacent the ends thereof, which seats are provided with ports that communicate respectively with the chambers in said housing, valves mounted for rotation within said seats, each valve being provided with ports that are adapted to register with the ports in the valve seats as said valves are rotated, a tubular member connecting said valves, one end of which tubular member communicates with one of the ports in one of said valves to permit the discharge of combined cooling and scavenging air from said tubular member and the wall of said tubular member being provided adjacent one end with openings to permit the inlet of combined cooling and scavenging air.

3. In a motive power producing apparatus, a stationary housing divided into a plurality of chambers, valve seats arranged between said chambers adjacent the ends thereof, which seats are provided with ports that communicate respectively with the chambers in said housing, valves mounted for rotation within said seats, each valve being provided with ports that are adapted to register with the ports in the valve seats as said valves are rotated, a tubular member connecting said valves, one end of which tubular member communicates with one of the ports in one of said valves to permit the discharge of combined cooling and scavenging air from said tubular member, the wall of said tubular member being provided adjacent one end with openings to permit the inlet of combined cooling and scavenging air, a shell surrounding said housing and spaced apart therefrom and means for admitting air to the chamber between said shell and housing.

4. In a motive power producing apparatus, a stationary housing divided into a plurality of chambers, valve seats arranged between said chambers adjacent the ends thereof, which seats are provided with ports that communicate respectively with the chambers in said housing, valves mounted for rotation within said seats, each valve being provided with ports that are adapted to register with the ports in the valve seats as said valves are rotated, a tubular member connecting said valves, one end of which tubular member communicates with one of the ports in one of said valves to permit the discharge of combined cooling and scavenging air from said tubular member, the wall of said tubular member being provided adjacent one end with openings to permit the inlet of combined cooling and scavenging air, a shell surrounding said housing and spaced apart therefrom, means for admitting air to the chamber between said shell and housing, means for delivering a fuel mixture to one of said valve seats, a chamber located adjacent the opposite valve seat for receiving the ignited fuel charges and products of combustion from said chambers and for receiving the air delivered to the chamber between said shell and said housing and said housing being provided with a discharge opening.

5. In a motive power producing apparatus, a stationary housing divided into a plurality of chambers, the ends of which chambers are provided with ports, a member arranged for rotation within said housing between said chambers and provided with ports adapted to communicate with the ports of said chambers as said member is rotated, means for delivering fuel charges at one end of said chambers, means for igniting the fuel charges in said chambers, means for imparting rotary motion to said rotatably mounted member, a shell enclosed by and spaced apart from said housing and providing an annular space between said shell and housing, means for delivering air for cooling purposes into said annular space, means whereby an inner or central chamber is formed by the inner walls of the chambers in the housing and the rotatably mounted member, means whereby a part of the air delivered to said annular space is caused to flow to said central chamber, means to direct said part of air from the central chamber through the combustion chambers to mix with and scavenge the products of combustion therefrom, whereby said combustion chamber is also cooled, means for mixing the other portion of cooling air with the mixture of products of combustion and cooling and scavenging air escaping from the combustion chamber, a receiving chamber adjacent one end of the housing for receiving all of the cooling and scavenging air or gases and products of combustion from the chambers within the housing and the annular cooling space and said receiving chamber being provided with a discharge opening.

ALFRED WILSTAM.